US005618017A

United States Patent [19]

De Boer

[11] Patent Number: 5,618,017

[45] Date of Patent: Apr. 8, 1997

[54] SUPPORTING PLATE UNIT FOR CEILING

[76] Inventor: Hermanus P. M. De Boer, Bongerd 90, NL-8212 Be Lelystad, Netherlands

[21] Appl. No.: 87,851

[22] Filed: Jul. 9, 1993

[51] Int. Cl.$^6$ .......... F16M 11/00

[52] U.S. Cl. .......... 248/201; 248/323; 248/343

[58] Field of Search .......... 248/317, 342, 248/343, 344, 201, 906, 323, 217.3, 217.2, 216.1; 52/506.06, 506.07, 506.08, 28; 362/404, 365, 366, 147, 150

[56] References Cited

U.S. PATENT DOCUMENTS

| | | | |
|---|---|---|---|
| 1,568,279 | 1/1926 | Herskovitz | 248/343 |
| 1,819,460 | 8/1931 | Frank | 248/217.3 X |
| 2,642,241 | 6/1953 | Pryne | 248/343 |
| 2,802,933 | 8/1957 | Broadwin | 362/366 |
| 2,917,263 | 12/1959 | Appleton et al. | 248/217.3 |
| 3,327,984 | 6/1967 | Rennie | 248/343 |
| 3,601,428 | 8/1971 | Gilb | 248/217.3 X |
| 4,293,895 | 10/1981 | Kristofek | 362/365 X |
| 4,336,575 | 6/1982 | Gilman | 362/365 X |
| 4,544,119 | 10/1985 | Kellett et al. | 248/217.3 |
| 4,920,719 | 5/1990 | Shaub et al. | 52/731.2 X |
| 4,972,339 | 11/1990 | Gabrius | 248/343 X |

FOREIGN PATENT DOCUMENTS 22315-00 7/1992 Netherlands .

*Primary Examiner*—Korie Chan

*Attorney, Agent, or Firm*—Young & Thompson

[57] ABSTRACT

This device includes a supporting plate unit to contact a ceiling panel and for supporting one or more objects which project at least partially through the ceiling panel, in which the supporting plate unit comprises at least one supporting plate which is fixed with one or more retaining lips in the ceiling panel, and the supporting plate preferably comprises a triangular section for reinforcing the structure thereof.

4 Claims, 3 Drawing Sheets

SUPPORTING PLATE UNIT FOR CEILING

BACKGROUND OF THE INVENTION

The invention relates to a supporting plate unit to contact a ceiling panel and for supporting one or more objects which project at least partially through the ceiling panel.

Such supporting plate units are commonly used in the case of ceiling panels with a modular construction, in other words, in the case of ceiling panels which are supported by a frame. Such supporting plate units give support to, for example, light fittings. A commonly used construction comprises a supporting plate unit consisting of one or more plywood sheets which are laid on a ceiling panel. Such supporting sheets are strong, but they have the disadvantage that they are heavy and take up a relatively large amount of height.

SUMMARY OF THE INVENTION

The object of the present invention is to provide a supporting plate unit which is light and takes up little in height.

A further object of the present invention is to provide a supporting plate having adjustable openings for accommodating the one or more objects to be supported.

For this purpose, the invention provides a plate unit of the type mentioned in the preamble, characterized in that the supporting plate unit is of thin metal and comprises at least one supporting plate which is fixed by one or more retaining lips in the ceiling panel. With such a construction, very little space is taken up and good positioning is achieved, while the unit is lightweight.

In a preferred embodiment, the supporting plate comprises a triangular section for reinforcing the structure thereof.

In another preferred embodiment, the supporting plate unit comprises two supporting plates which each have at the edge a substantially toothed structure with openings lying opposite each other, between which the one or more objects can be clamped.

In a further preferred embodiment, openings are provided in such a way relative to each other in the triangular sections of the supporting plates that positioning lips can project through them. This achieves the advantage that two supporting plates fitted adjacent to each other cannot tilt relative to each other and the ceiling panel. Shifting of the supporting plates in a direction at right angles to the lengthwise direction of the positioning lips is also prevented. Moreover, the distance between both supporting plates may be varied according to the desired application.

In yet another embodiment, the positioning lips are bent over at their ends. This ensures that the supporting plates can hardly move any more in the lengthwise direction of the positioning lips.

BRIEF DESCRIPTION OF THE DRAWINGS

Further embodiments can be deduced from the description which now follows and from the drawings, which explain the invention further and are intended only by way of illustration, and in which.

DETAILED DESCRIPTION OF THE EMBODIMENTS

Figure 1:
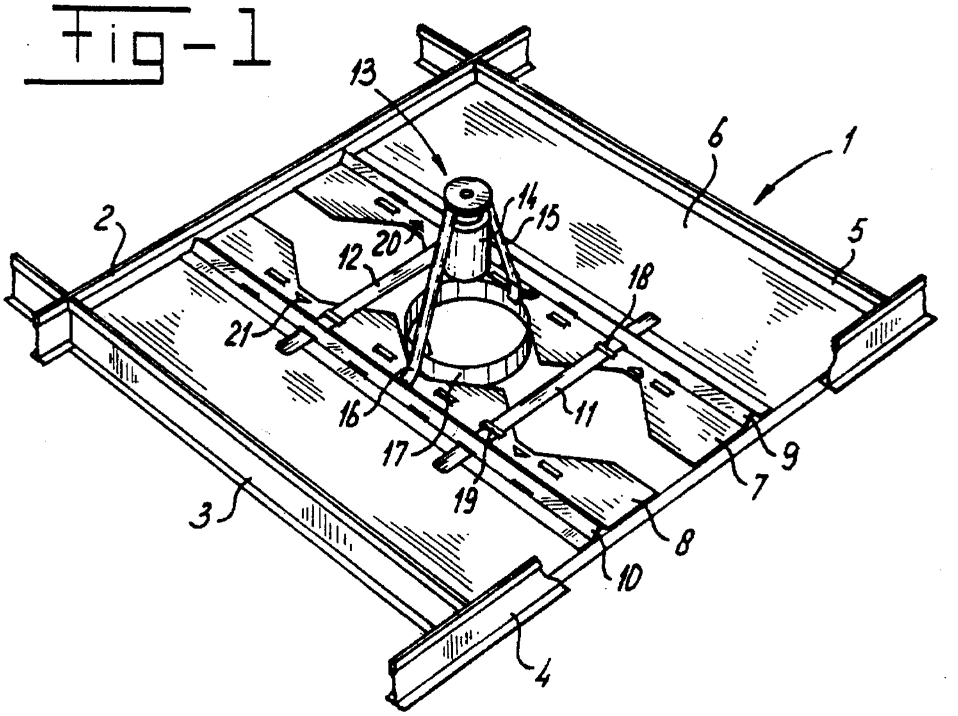
FIG. 1 shows a general view of a supporting plate unit according to the invention, fitted on a ceiling panel and provided with a holder for, for example, a spotlight.

FIG. 1 shows a general view of a supporting plate unit 1 according to the invention, fitted on a ceiling panel 6, which is supported by four ceiling panel supports 2, 3, 4, and 5 (generally known as system ceiling). The supporting plate unit 1 is made of thin metal, for example aluminum, and in the embodiment of FIG. 1 rests on the top side of a ceiling panel 6, in which an opening is provided, so that the supporting plate unit 1 is accessible from below.

Figure 9:
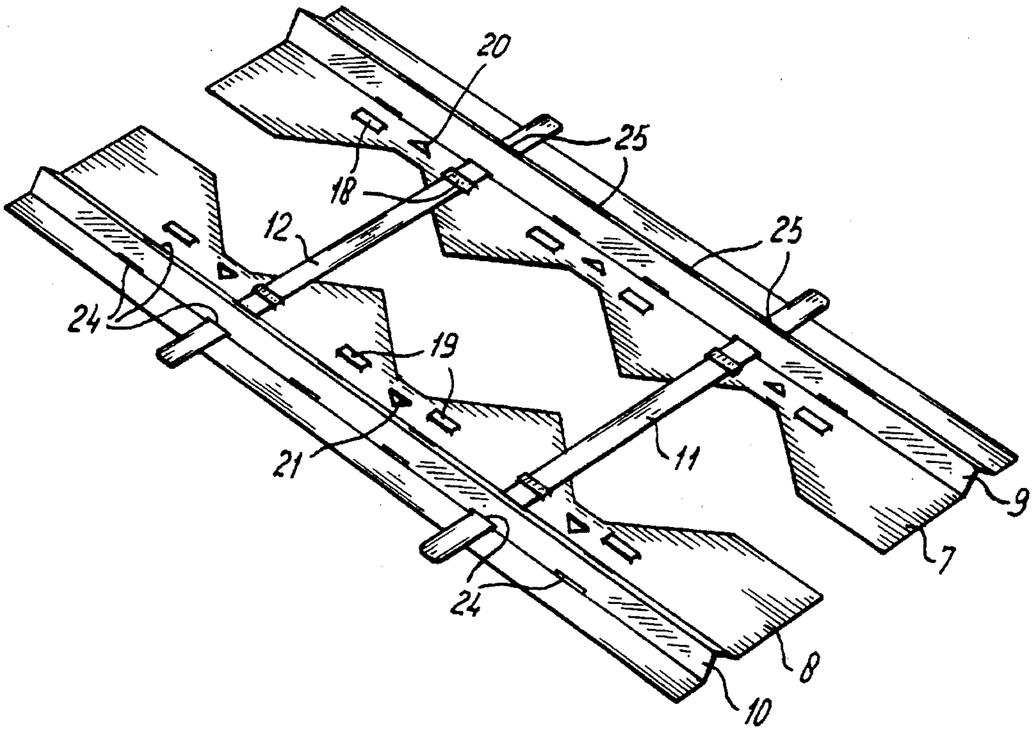
FIGS. 9 and 10 show a top view and bottom view respectively of the supporting plate unit.
Figure 10:
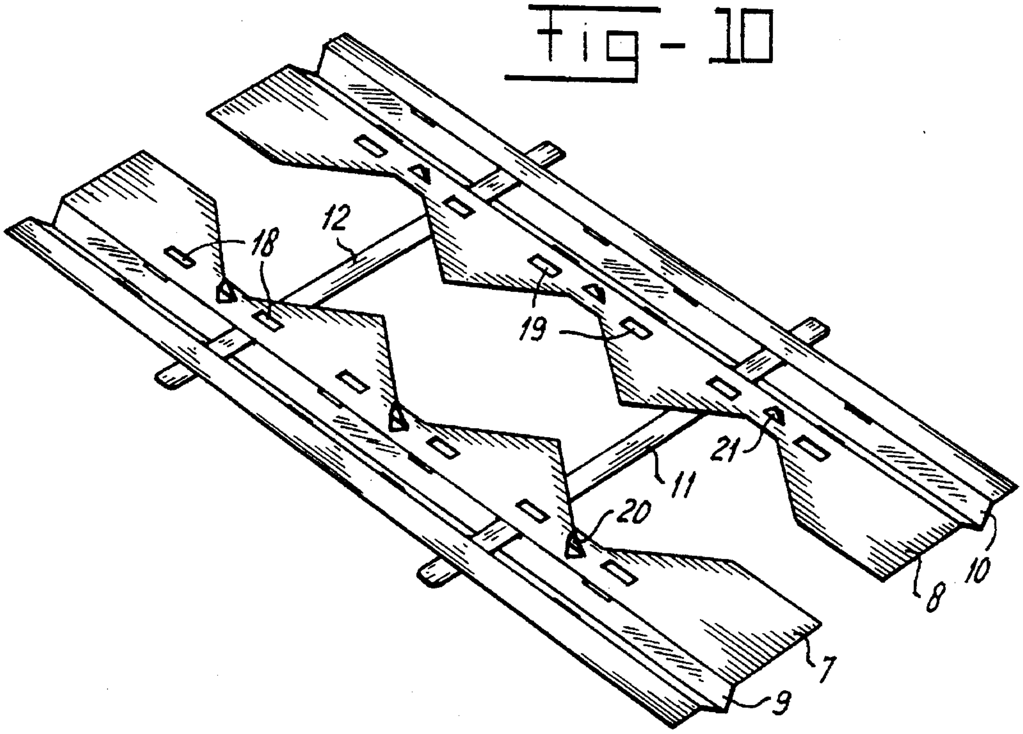

The supporting plate unit consists essentially of two loose supporting plates 7, 8, each comprising a triangular section 9, 10 for reinforcing the structure. The two supporting plates 7, 8 are fitted in the correct position independently of each other during the mounting, following which they are connected to each other by positioning lips 11, 12. Two of such positioning lips 11, 12 are shown in the figure, but it will be clear to the person skilled in the art that other numbers can also be used. The supporting plates 7, 8 are also held in place by retaining lips 20, 21, which are bent out of the sheet material of the supporting plates themselves and pushed into the material of the ceiling panel 6. All this is shown in greater detail in FIGS. 9 and 10. FIG. 9 shows a top view of the supporting plate unit 1, while FIG. 10 shows a bottom view, the terms "bottom" and "top" being intended only by way of example, and not being intended to restrict the application of the invention. It can be seen therein that, apart from the retaining lips 20, 21, such eye-shaped pieces 18, 19 are also pressed out of the sheet material of the supporting plates 7, 8 that an opening through which a positioning lip 1, 12 can be pushed is formed, which positioning lip 11, 12 also projects through openings 24, 25 in the triangular sections. Of course, separate eye-shaped openings 18, 19 can also be provided on the supporting plates 7, 8, for example by welding.

The positioning lips 11, 12 are fitted after the supporting plates are in position. Thus, the distance between the two supporting plates 7, 8 may be varied according to the desired application. The positioning lips 11, 2 prevent the supporting plates 7, 8 from being able to tilt relative to each other and the ceiling panel 6. They also prevent the supporting plates 7, 8 from slipping in a direction at right angles to the lengthwise direction of the positioning lips 11, 12, and thus support the action of the retaining lips 20, 21. The positioning lips 11, 12 can be bent over at their ends (not shown), so that the supporting plates 7, 8 are also less likely to slide in the lengthwise direction of the positioning lips 11, 12.

Figure 4A:
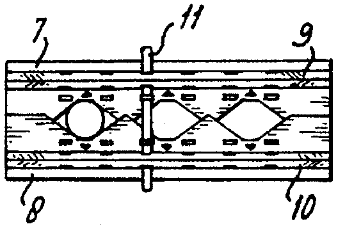
FIGS. 4*a* to 4*c* show top views of a supporting plate unit according to the invention.
Figure 4B:
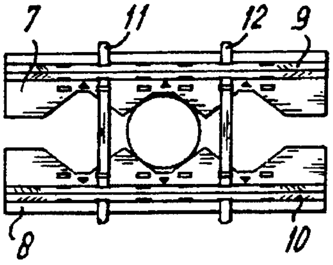
Figure 4C:
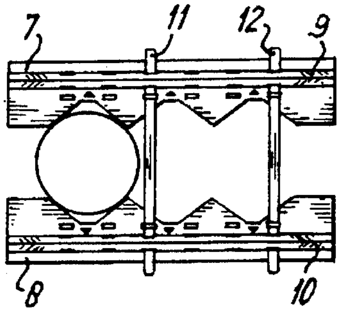

In a preferred embodiment, the sides of the two supporting plates 7, 8 facing each other have a substantially toothed structure, in which the projecting points and recessed parts thereof lie opposite each other, so that a holder 13 for, for example, a spotlight can be clamped between the recessed parts. The distance between the two supporting plates 7, 8 can be varied as desired, so that two standard supporting plates 7, 8 for holders with differing diameters can be used, as shown in greater detail in FIGS. 4*a* to 4*c*.

Figure 3:
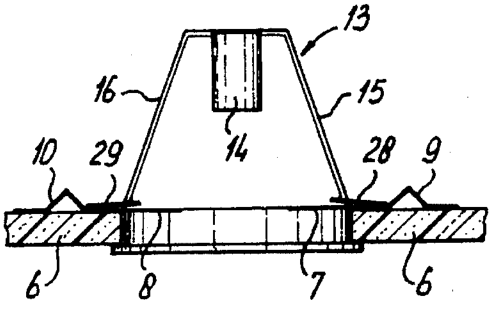
FIG. 3 shows a side view in cross-section of a supporting plate unit for a holder of a spotlight according to the invention.

FIG. 1 shows a holder 13 comprising a fitting 14 which is held in place by two fitting supports 15, 16. The fitting supports 15, 16 rest on the supporting plates 7, 8 with two respective lips 28, 29, which are shown in FIG. 3. The entire holder 13 is clamped between two recessed parts of the supporting plates 7, 8 by an annular cap 17, which can also contain a reflector (not shown).

The invention is not restricted to the application for spotlights; other objects which have to be fitted to a ceiling, for example smoke alarms, direction signs etc., can also be supported by the supporting plate unit 1 according to the invention.

Figure 2:
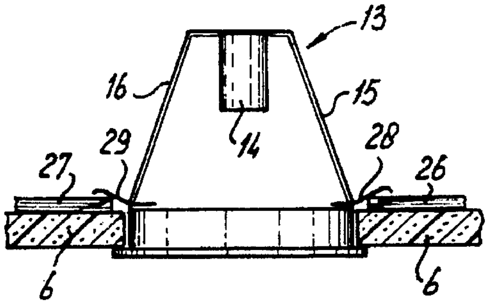
Fig-2 PRIOR ART
FIG. 2 shows a side view in cross-section of a supporting plate unit for a holder of a spotlight according to the prior art.

FIG. 2 shows in cross-section a supporting plate unit according to the prior art. The same reference numbers refer to the same parts here as in FIG. 1. The great difference from the supporting plate unit according to the invention is that in the device according to the prior art the lips 28, 29 rest on plywood panels 26, 27, which in turn rest directly on a ceiling panel 6.

FIG. 3 shows a cross-section of the supporting plate unit corresponding to the invention. The triangular sections 9, 10 of the supporting plates 7, 8 are easy to see here. The lips 28, 29 preferably rest on flat parts of the supporting plates 7, 8 next to the triangular sections.

Figure 5:
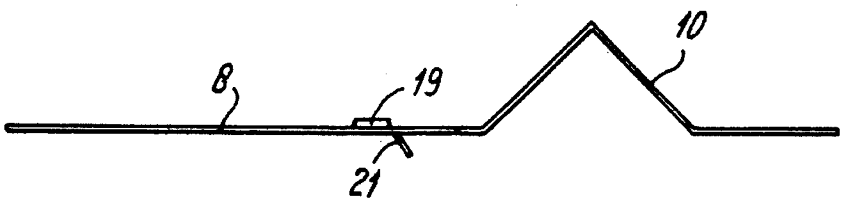
FIG. 5 shows a cross-section of a part of a supporting plate unit according to the invention.

FIG. 5 shows a cross-section of a supporting plate 7, 8 according to the invention. The earlier mentioned retaining lips 20, 21 project at the side of the plate opposite the side in which the triangular section is situated, by means of which lips the supporting plate 7, 8 engages in a ceiling panel 6, thus preventing the supporting plate 7, 8 from being able to shift relative to the ceiling panel 6.

Figure 6:
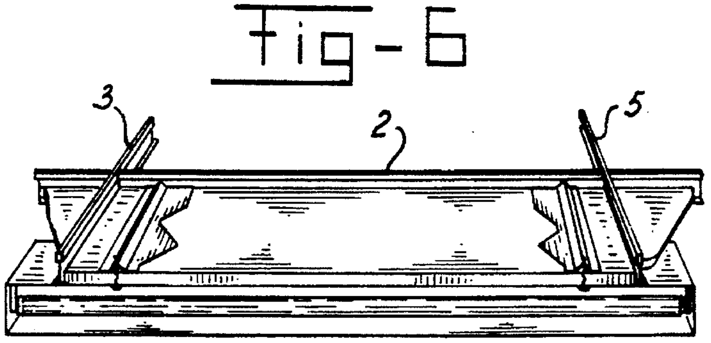
FIG. 6 shows a top view of a supporting plate unit for a light fitting to fitted on the underside of a ceiling panel.
Figure 7:
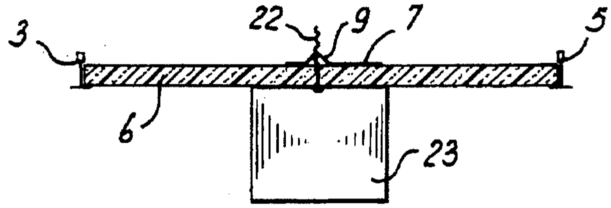
FIG. 7 shows a cross-section of the supporting plate unit according to FIG. 6.

FIG. 6 shows an embodiment of the supporting plates according to the invention, in which the supporting plates 7, 8, as in the previous figures, are situated on top of the ceiling panel 6, but the structure to be carried is situated below the ceiling panel 6. By way of example, the supporting plate unit bears a box 23 of fluorescent light fittings, as shown in FIG. 7. A fitting 23 is fixed at the bottom side against the ceiling 6 by fixing means, for example screws 22, which are screwed through the ceiling panel 6 to the triangular sections 9, 10, for example by tightening the screws 22. In principle, it is possible in this way to use only one supporting plate 7, 8 if the structure to be carried is not too heavy. The box 23 can be designed for various uses and can be, for example a lampholder, but can also be a part of a direction sign or the like.

Figure 8:
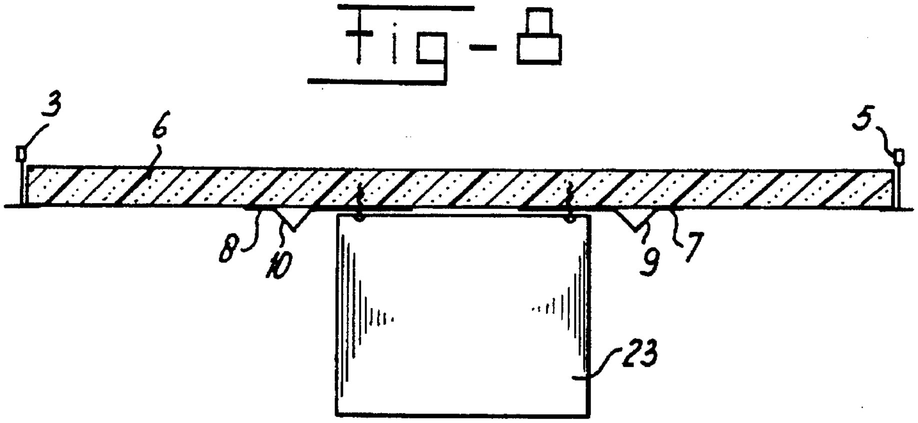
FIG. 8 shows a cross-section of a supporting plate unit in which the supporting plate unit is fitted as a whole on the underside of a ceiling panel.

FIG. 8 shows yet another potential use of the supporting plates 7, 8. In this case the supporting plates 7, 8 themselves are fitted below the ceiling panel 6. The supporting plates 7, 8 are pressed into the ceiling panel 6 by their retaining lips 20, 21 (not shown) during fitting, and are positioned relative to each other by the positioning lips 11, 12 (not shown either). A box 23 to be carried by the supporting plates 7, 8, for example, a lampholder again, is fixed by fixing means, for example screws 22, to the supporting plates 7, 8. The supporting plates 7, 8 rest on the ceiling panel supports 2 and 4 (not shown here), so that the weight is borne fully by the supporting plates. For this fixing method, the supporting plates have to be adjusted slightly at the ends. The positioning lips 11, 12 (not shown) are not necessary here, since the box 23 takes over their task.

I claim:

1. A supporting plate unit for contacting a ceiling panel and for supporting at least one object, the supporting plate unit being made of thin metal and comprising a set of two supporting plates each having one or more retaining lips bent out of the thin metal supporting plates, extending from said supporting plates about a predetermined angle and having a shape suitable to be pushed into material of a ceiling, said supporting plates comprising a triangular section in their longitudinal direction for reinforcing the structure thereof, wherein each of said supporting plates faces each other and is provided with an edge with a substantially toothed structure having projecting points and recessed parts, said recessed parts of each supporting plate facing each other and defining together a saw-toothed aperture, and a lamp holder disposed in said aperture.

2. A supporting plate unit for contacting a ceiling panel and for supporting at least one object, the supporting plate unit being made of thin metal and comprising a set of two supporting plates each having one or more retaining lips bent out of the thin metal supporting plates, extending from said supporting plates about a predetermined angle and having a shape suitable to be pushed into material of a ceiling, said supporting plates comprising a triangular section in their longitudinal direction for reinforcing the structure thereof, further comprising two separate positioning lips, each of said triangular sections having openings therein for receiving therethrough one end of said positioning lips which project through both supporting plates.

3. The supporting plate unit for contacting the ceiling panel and for supporting said at least one object according to claim 2, wherein said supporting plates each comprise eye-shaped openings for receiving therethrough said positioning lips.

4. The supporting plate unit for contacting the ceiling panel and for supporting said at least one object according to claim 3, wherein the positioning lips are bent at their ends.

* * * * *